United States Patent
Yltchev-Edelmann et al.

(10) Patent No.: US 9,182,255 B2
(45) Date of Patent: Nov. 10, 2015

(54) SENSOR

(71) Applicant: Sick AG, Waldkirch (DE)

(72) Inventors: Georgy Yltchev-Edelmann, Waldkirch (DE); Ulrich Bernatzki, Ettringen (DE)

(73) Assignee: SICK AG, Waldkirch (DE)

( * ) Notice: Subject to any disclaimer, the term of this patent is extended or adjusted under 35 U.S.C. 154(b) by 268 days.

(21) Appl. No.: 14/061,467

(22) Filed: Oct. 23, 2013

(65) Prior Publication Data

US 2014/0109700 A1    Apr. 24, 2014

(30) Foreign Application Priority Data

Oct. 24, 2012    (DE) .......................... 10 2012 110 167
Oct. 17, 2013    (EP) ..................................... 13189014

(51) Int. Cl.
*G01D 11/30*    (2006.01)
*G01D 11/24*    (2006.01)

(52) U.S. Cl.
CPC .............. *G01D 11/30* (2013.01); *G01D 11/245* (2013.01)

(58) Field of Classification Search
CPC ......... F16L 27/12; F16L 15/02; F16L 33/224; G01D 11/24; G01D 11/30; G01K 1/08; G01K 1/14
See application file for complete search history.

(56) References Cited

U.S. PATENT DOCUMENTS

| 2,941,822 | A | * | 6/1960 | Moecker | A47L 9/244 |
| | | | | | 285/298 |
| 4,099,670 | A | * | 7/1978 | Cole | B05B 15/10 |
| | | | | | 239/205 |
| 4,099,798 | A | * | 7/1978 | Steinmetz | B23Q 11/0875 |
| | | | | | 15/236.01 |
| 4,137,768 | A | | 2/1979 | Tushie et al. | |
| 4,296,953 | A | * | 10/1981 | Nagao | F16L 27/12 |
| | | | | | 285/302 |
| 4,652,024 | A | * | 3/1987 | Krohn | F16L 27/12 |
| | | | | | 15/144.4 |
| 4,720,124 | A | * | 1/1988 | Taylor | E21B 43/0107 |
| | | | | | 285/18 |
| 5,316,264 | A | * | 5/1994 | Newman, Sr. | F16L 27/12 |
| | | | | | 137/899 |

(Continued)

FOREIGN PATENT DOCUMENTS

DE    1 247 427 B    8/1967
DE    26 30 498 A    1/1977

(Continued)

OTHER PUBLICATIONS

German Search Report in the Counterpart Application No. 10 2012 110 167.1, dated Sep. 26, 2013, eight (8) pages.

(Continued)

*Primary Examiner* — David A Rogers
(74) *Attorney, Agent, or Firm* — Nath Goldberg & Meyer; Jerald L. Meyer; Rury L. Grisham

(57) ABSTRACT

A sensor has a receiver device (16) is configured such that the sensor holder (44) is rotatable with respect to the installation body (14) and is adjustable by a telescopic extension or retraction or the sensor holder (44). The receiver is rotatable with respect to the installation body and tiltable with respect to the installation body, and has clamping elements (18) for the sensor holder (44). The clamping elements (18) can be clamped tight by means of a cap nut (20) which engages into a thread (24) of the receiver device (16). The cap nut (20) has a first sealing ring (30) at an opening (28) and contacting the sensor holder (44), and has a second sealing ring (34) at the oppositely disposed opening (32) and contacting the installation body (14). The sealing rings (30, 34) are connected without joints to the cap nut (20).

9 Claims, 10 Drawing Sheets

(56) References Cited

U.S. PATENT DOCUMENTS

| | | | | |
|---|---|---|---|---|
| 5,449,205 | A * | 9/1995 | Silletti | F16L 19/02 285/148.13 |
| 5,853,113 | A * | 12/1998 | Small | B67D 7/68 222/379 |
| 5,858,311 | A * | 1/1999 | Bachtel | C10G 49/26 122/511 |
| 6,059,321 | A * | 5/2000 | Lyall, III | F16L 21/022 285/139.1 |
| 6,168,212 | B1 * | 1/2001 | Finley | F16B 7/1427 285/302 |
| 6,282,943 | B1 * | 9/2001 | Sanders | G01N 33/0009 73/23.2 |
| 6,322,006 | B1 * | 11/2001 | Guo | B05B 15/064 239/280 |
| 6,375,135 | B1 * | 4/2002 | Eason | F16M 11/16 248/163.1 |
| 6,599,012 | B2 * | 7/2003 | Gul | B01K 1/14 374/148 |
| 7,677,607 | B2 * | 3/2010 | Densel | F16L 15/02 285/145.1 |
| 8,408,082 | B2 * | 4/2013 | Dahler | G01N 1/2247 73/863.01 |
| 8,955,344 | B2 * | 2/2015 | Kostelecky | F24F 11/001 374/208 |
| 2002/0073788 | A1 * | 6/2002 | Hatley | B25J 5/00 73/866.5 |
| 2005/0206910 | A1 * | 9/2005 | Schroeder | G01B 7/001 356/614 |
| 2005/0223829 | A1 * | 10/2005 | Mayeaux | G01N 1/2035 73/866.5 |
| 2008/0122234 | A1 * | 5/2008 | Alioto | B66C 19/002 294/81.1 |
| 2008/0231041 | A1 * | 9/2008 | Bucchi | F16L 33/224 285/32 |
| 2009/0151935 | A1 * | 6/2009 | Lovell | E21B 17/07 166/250.03 |
| 2011/0272888 | A1 * | 11/2011 | Irizzary | F16L 21/03 277/314 |
| 2012/0125131 | A1 * | 5/2012 | Sue | F01D 17/02 73/866.5 |
| 2014/0260712 | A1 * | 9/2014 | Damren | A61M 39/18 73/866.5 |

FOREIGN PATENT DOCUMENTS

| | | |
|---|---|---|
| DE | 35 30 776 C2 | 12/1991 |
| DE | 43 18 563 C2 | 4/1995 |
| DE | 195 39 782 A1 | 4/1997 |
| DE | 298 17 485 U1 | 2/1999 |
| DE | 199 61 827 A1 | 6/2001 |
| DE | 198 00 553 C2 | 7/2003 |
| DE | 42 43 881 B4 | 5/2005 |
| DE | 10 2005 023 003 A1 | 11/2006 |
| DE | 20 2006 020 309 U1 | 5/2008 |
| DE | 10 2007 014 357 A1 | 10/2008 |
| DE | 10 2007 018 001 A1 | 10/2008 |
| DE | 10 2007 061 571 A1 | 7/2009 |
| DE | 10 2008 019 697 A1 | 10/2009 |
| DE | 20 2009 015 391 U1 | 3/2010 |
| DE | 10 2006 040 135 B4 | 4/2010 |
| DE | 103 16 299 B4 | 11/2010 |
| DE | 10 2009 023 343 A1 | 12/2010 |
| DE | 20 2009 017 961 U1 | 12/2010 |
| DE | 11 2009 001 330 T5 | 4/2011 |
| DE | 10 2009 046 443 A1 | 5/2011 |
| DE | 20 2011 051 324 U1 | 1/2012 |
| DE | 10 2008 025 067 B4 | 6/2012 |
| DE | 20 2012 000 895 U1 | 6/2012 |
| DE | 10 2006 020 247 B4 | 7/2013 |
| EP | 2 574 895 A1 | 4/2013 |

OTHER PUBLICATIONS

European Search Report in the Counterpart Application No. 13189014.7, dated Jan. 23, 2014, seven (7) pages.

* cited by examiner

SENSOR

The invention relates to a sensor having a sensor holder and an installation body which has a receiver device for the sensor holder at one end of the installation body and which has an interior, wherein connector lines for the sensor are guided at the interior in the installation body, wherein the receiver device is configured such that the sensor holder is rotatable with respect to the installation body and is adjustable by a telescopic extension or retraction or the sensor holder is rotatable with respect to the installation body and tiltable with respect to the installation body.

On the use of sensors, for example optical sensors, optoelectronic sensors, inductive sensors or capacitive sensors in industrial plant or machinery, it is necessary that the sensors are installed in space exactly where an object has to be reliably detected. It is usually not easily possible to fasten the sensor to an already existing machine part. So-called bar holding systems are therefore used in many cases. A round-section bar is in this respect installed at a machine part via a clamping element. A further clamping element is attached to the other end of the round-section bar and an installation plate which is fixedly connected to the sensor housing by a screw connection is attached to this clamping element.

Such a bar holding system is able to align the sensor individually to the correct position and location via the connection of the two clamping elements with the round-section bar and with the installation plate. In this respect, there is a large choice of degrees of freedom which can even be set a multiple of times in some cases.

The variety of possibilities with respect to the setting and alignment of the bar holding system, however, produce a substantial technical and time effort on the installation and alignment of the sensor. This is due, on the one hand, to the large number of individual parts, namely at least the round-profile bars, two single-part or multipart clamping elements, as well as four or more screws with nuts and washers for clamping the clamping elements which have to be assembled with the aid of different tools to from the described bar holding system. On the other hand, every single adjustment point of the bar-holding system has to be aligned to bring the sensor into the desired position and location. The installation effort and alignment effort is in particular enormous when a plurality of sensors have to be attached. However, a replacement of a sensor is complex since per sensor at least two screw connections have to be released and connected to the new sensor again, with subsequently at least later adjustments needing to be made to the alignment as a rule.

Due to a lack of alternatives, the previously described bar holding systems are very frequently also used when the system to which the sensor is to be attached does not actually make any special demands on the alignment capability of the sensor and of the sensor holder respectively. This is, for example, the case when the sensor only has to be aligned in parallel or at an angle of 90° with respect to the axes of the respective system part.

A clamping apparatus for the installation of sensors is known from DE 199 61 827 A1. It is used in the described conventional bar holding systems and is therefore not able to reduce the number of individual parts and the installation effort.

An optoelectronic apparatus is known from DE 198 00 553 C2 in which the housing has a receiver formed by two half-shells in which receiver the active sensor elements can be rotated. The alignability in the rotary directions is thus admittedly made possible, but there is no holder for attachment to a machine part or to a conveyor belt. Additional elements would again be needed for this purpose, for example the previously described bar holding system.

DE 20 2009 017 961 U1 discloses an optoelectronic sensor having a sensor head which has a light transmitter and/or a light receiver as well has having an installation body which merges at its one end into a receiver device for the sensor head and has an installation region for attaching the sensor to an operating site, characterized in that the receiver device is configured such that the sensor head is movable with respect to the installation body.

It is therefore the object of the invention to simplify the installation and alignment of a sensor. A further equal object comprises providing a fastening possibility which has hygienic suitability and which can be used in hygiene critical areas, for example in the food industry or in the pharmaceutical industry. It is a further object to provide a simple, space-saving and simultaneously hygienically suitable fastening possibility, wherein a comfortable and precise sensor adjustment should be made possible.

The object is satisfied by a sensor having a sensor housing, a sensor holder to which the sensor housing is fastened, and having an installation body which has a receiver device for the sensor holder at its one end, wherein connector lines for the sensor are guided at the interior in the installation body, wherein the receiver device is configured such that the sensor holder is rotatable with respect to the installation body and is adjustable by a telescopic extension or retraction or the sensor is rotatable with respect to the installation body and tiltable with respect to the installation body, wherein the receiver device has clamping elements for the sensor holder, wherein the clamping elements can be clamped tight by means of a cap nut which engages into a thread of the receiver device, wherein the cap nut has a first sealing ring at an opening, said first sealing ring contacting the sensor holder, and has a second sealing ring at the oppositely disposed openings, said second sealing ring contacting the installation body, wherein the sealing rings are connected without joins to the cap nut and an angle α greater than 90° is formed between an outer surface of the first sealing ring and an outer surface of the sensor holder or between an outer surface of the second sealing ring and an outer surface of the installation body.

The sensor holder and the installation body are configured to be adjusted by telescopic extension and retraction and such that the sensor holder is rotatable with respect to the installation body or the sensor holder (44) is rotatable with respect to the installation body and is tiltable with respect to the installation body. Degrees of freedom can thus be adjusted in a spacing direction or vertical direction or in an angle of rotation or a tilt angle. The sensor holder is locked in the desired position by the clamping elements since the sensor holder is initially held by force transmission. The sensor holder is, however, still adjustable in this position. As soon as the sensor holder has reached the desired position, the position is fixed with the aid of the cap nut. This is done in that the cap nut has an internal thread at the inner side and a conical/spherical or similar inner surface with a wedge effect. The internal thread engages into the thread of the receiver device. The clamping elements which each have an oblique surface at their outer sides which is adapted to the conical inner surface of the cap nut are pressed toward the outer side of the sensor holder by a rotation of the cap nut into the thread, whereby the sensor holder is clamped tight in the installation body. The installation body furthermore optionally has an installation region for attaching the sensor to an operating site. The sensor holder and the installation body can be configured as tubular.

Depending on the type of sensor, it can have separate or common transmission and reception units, for example separate with an optoelectronic sensor for example, with a through beam light barrier, for example, or common such as with a light scanner, for example. Depending on the design, the sensor housing comprises, for example, an optics, for example a lens for focusing a transmitted beam or for example an imaging optics for the reception element, or diaphragms for setting transmission cones and reception cones. It is furthermore preferred also to provide the required sensor electronics in the sensor housing such as a driver circuit for the sensor, one or more microprocessors, DSPs (digital signal processors), FGPAs (field programmable gate arrays) or other logic modules for a signal processing and evaluation, operating elements and teaching elements and the like. Finally, an interface is provided to communicate sensor data, to switch by a switch command in the case of a light barrier or of a similar sensor or to receive commands, with this interface being led over the receiver device.

The receiving device in this respect also optionally provides, in addition to its primary function as a mechanical connection between the sensor holder and the installation body, an electrical connection for data communication and/or power supply, with the corresponding lines being led inwardly through the installation body and being connected at its other end to a plant control, to a configuration device such as a computer or a PDA and/or to a supply. The connector lines for the sensor are thus protected against mechanical damage or other damage by the installation body. The connector line is furthermore led tightly at the installation body so that the connector line is protected against environmental influences and is suitable for applications in sterile plants due to the easy-to-clean design. The typical operating site for the sensors in accordance with the invention is at a plant, at a machine or at a conveyor belt where the installation region is, for example, attached to a plant part or to a section rail.

The cap nut furthermore has a first sealing ring at an opening, said first sealing ring contacting the sensor holder, and a second sealing ring at the oppositely disposed opening, said second sealing ring contacting the installation body. The sealing rings are places into a peripheral inner groove at the respective openings of the cap nut. It is ensured by the sealing rings that a tight connection is present between the sensor holder and the installation body. The sealing connection or sealing function is in this respect formed by the outer margin of the seal so that the sealing effect is present at the outer contour so that no contaminants or cleaning agents can penetrate between the sealing ring and the contact surface of the sealing ring. The seal by the sealing rings is configured such that it also withstands high pressure strains, that is, for example, a steam jet or a water jet of a cleaning device. The seal is in this respect configured according to the protection classes IP65, IP67 or IP69 in accordance with the standard EN 60529. The protection class IP stands for "ingress protection".

The sealing rings are furthermore connected to the cap nut free of joins. It is thereby prevented that dirt can collect between the cap nut and the sealing ring. The join-free surfaces can be cleaned easily. A use in hygiene-critical areas, for example in the food-processing industry or in the pharmaceutical industry, is possibly due to the join-free connection of the sealing ring and the cap nut.

Furthermore, an angle larger than 90° is formed between an outer surface of the first sealing ring and an outer surface of the sensor holder or between an outer surface of the second sealing ring and an outer surface of the installation body. It is furthermore prevented by the obtuse angle between the seal and the sensor holder that dirt can collect at the connection point between the sensor holder or the installation body and the sealing rings. It is furthermore achieved that fluids, for example cleaning fluids, can flow off better. The cleaning property is furthermore improved whereby in turn the use in hygiene-critical areas is improved.

In a further development of the invention, the receiver device has a rotatable clamping body having at least one partly conical surface and one mushroom-shaped seal. The cap nut has a conical or spherical segment for locking the clamping body. The sensor holder is displaceably arranged in the clamping body. The clamping body in this respect lies in a partly spherical segment of the installation body, whereby the clamping body is supported tiltably with the sensor holder and rotatably in the installation body. The sensor holder is furthermore optionally also displaceable and rotatable with respect to the installation body. The clamping body can be locked by the cap nut so that the sensor holder is fixable at a specific tilt position. The clamping body optionally has a plurality of clamping elements in order simultaneously to allow a clamping of the sensor holder against longitudinal displacement by the preload of the cap nut.

In a further advantageous embodiment, clamping elements are attached to the installation body which also surround the clamping body from the side of the can nut and prevent a direct contact between the cap nut and the clamping body. A rotation of the clamping body can thereby be prevented by the friction of the cap nut to be turned tight.

The mushroom-shaped seal is furthermore anchored at the clamping body to allow an airtight and/or watertight shielding of the installation body, the sensor holder or the sensor. The seal is designed according to the rules of hygienic design so that the sealing sites are present in the most outward region of the mushroom umbrella of the mushroom-shaped seal toward the cap nut and in the outer region of the sensor holder leadthrough. At the contact site to the mushroom-shaped seal, the cap nut has a spherical surface section which is arranged concentrically to a center of rotation of the clamping body. The sealing function of the mushroom seal is thereby ensured in every permitted tilt position. The mushroom-shaped seal can be produced as a two-component injection-molded part, with the surfaces satisfying a sealing function comprising softer material.

In a further development of the invention, the installation body is coherent and in particular in one piece. The installation body is in particular join-free to improve the cleaning properties.

In accordance with a further preferred embodiment, the sensor holder is configured to release and to fix the sensor housing so that the sensor housing can be replaced. The sensor or the sensor housing with the sensor can thereby, for example, be replaced simply in the event of a defective sensor. The previous position can then easily be set again for the new sensor with the aid of a bayonet connection at the sensor holder. The original position of the sensor or of the sensor housing can be restored by the bayonet connection after a replacement without the sensor having to be realigned.

In accordance with a particular embodiment, the installation body and/or the sensor holder is/are configured in multipart modular form. The installation body and/or the sensor holder can thereby be adapted to specific geometries by further modules. The installation body or the sensor holder can thus be extended or the sensor can be arranged at a specific angular position by angle pieces. The installation body and/or sensor holder designed in multipart modular form can be provided as modules. A desired fastening can thereby be released in modular form with the aid of one or more modules.

The sensor in accordance with the invention is preferably configured as a through beam light barrier, a reflection light barrier or as a light scanner. They are typical examples of frequently used optoelectronic sensors in which a flexibility is often only required in some of the degrees of freedom because standardized applications such as at a conveyor belt do not make any high demands on the alignment. In general, however, any other type of sensor is also conceivable, that is also sensors for contrast recognition, for color recognition, distance measurement, etc. The sensor in accordance with the invention can furthermore be configured as an inductive or capacitive sensor.

The invention will also be explained in the following with respect to further advantages and features with reference to the enclosed drawing and to embodiments. The Figures of the drawing show in:

FIG. 1 and FIG. 2 a respective view of an optoelectronic sensor in accordance with the invention with a sensor holder, installation body and cap nut;

FIG. 3 a sectional representation of the sensor in accordance with the invention in accordance with FIG. 1 along a line in accordance with FIG. 2;

FIG. 4 an enlarged representation of a detail in accordance with FIG. 3;

FIG. 5 a representation of the sensor in accordance with FIG. 1, with the cap nut being released;

FIG. 6 a sectional representation in accordance with FIG. 5;

FIG. 7 an enlarged representation of a detail in accordance with FIG. 6;

FIGS. 8, 9, 11 and 12 respective representations of a sensor holder tiltable with respect to the installation body; and FIG. 10 a clamping body in a perspective representation.

FIG. 1 shows an embodiment of a sensor 10 in accordance with the invention having a sensor housing 12, a sensor holder 44 to which the sensor housing 12 is fastened and having an installation body 14 which has a receiver device 16 for the sensor holder 44 at its one end and, optionally, an installation region 22 for attaching the sensor 10 to an operating site. The sensor holder 44 and the installation body 14 are optionally tubular. In the Figures, the same parts are marked by the same reference numerals.

The sensor housing 12 comprises the elements required for the operation of, for example, an optoelectronic sensor 10. The optoelectronic sensor 10 comprises a light transmitter which irradiates light via a transmission optics into a monitored zone, the light being reflected or remitted there and being detected via a reception optics in a reception element. The sensor housing 12 has a front screen for the light entry and light exit. A control controls the light transmitter and processes the received signals of the reception element. This structure is only to be understood as an example. All conceivable forms of a light transmitter are possible such as a halogen lamp, a semiconductor element configured as an LED or as a laser diode, a light receiver, of a light receiver as a photodiode up to a reception row or reception matrix of an optics configured as a CCD or CMOS chip such as, as shown, a simple converging lens and of a control as a microprocessor as another digital logic module or as an analog circuit. Other arrangements than in accordance with the described dual aperture principle are accordingly also possible, for example an autocollimator arrangement. Finally, it is also conceivable that only a transmitter or only a receiver is provided in the sensor housing 12. The sensor 10 is frequently a simple sensor, for instance a simple light barrier or as a reflection light barrier or as a scanner, but also an another optoelectronic sensor.

The sensor housing 12, the sensor holder 44, the installation head 14 and the cap nut 20 can comprise materials such as stainless steel, metal or plastic. A use in the food industry is possible with suitable materials, for example stainless steel or fluorinated plastics.

The sensor housing 12 is replaceable in that the cap nut 20 at the receiver device is released at the thread 24. The sensor housing 12 of the optoelectronic sensor 10 can thus be serviced without problem together with the sensor holder 44 or can be replaced by an intact sensor, for example by a different or a more modern sensor. A partial or complete dismantling of the installation head 14 is not necessary in this respect. The installation head 14 can also be configured as a standardized installation base for different types of sensors into which then a sensor having a desired function can be inserted in dependence on the application. The connector lines are guided in the interior of the installation body 14. The connector lines are thus not disturbing in the installation and operation and are protected. The outwardly visible edges of the sensor housing 12, of the sensor holder 44, of the installation body 14 and in particular of the cap nut 20 are configured as round so that no dirt can collect. The gripping surfaces of the cap nut 20 are in particular provided with radii so that they are configured in rounded form to be able to be used in hygiene-critical areas.

FIG. 2 shows the sensor in accordance with FIG. 1 in a view rotated by 90 degrees and having the same reference numerals.

FIG. 3 shows a sectional representation of the sensor in accordance with the invention in accordance with FIG. 1 along a line A-A in accordance with FIG. 2. A region is shown by dashed lines in FIG. 3 which is shown in enlarged form in FIG. 4. FIG. 3 shows, in a sectional representation, the tubular sensor holder 44 and the tubular installation body 14 which are hollow at the interior. A cable, not shown, to the sensor housing 12 can be conducted through them. The sensor holder 44 and the installation body 14 are connected to one another by the clamping elements 18 and the cap nut 20. The installation region 22 has two blind holes which receive two screws to fasten the installation body 14 to an operating site, for example to a machine frame.

The receiver device 16 is configured such that the sensor holder 44 is adjustably by telescopic extension and retraction with respect to the installation body 14, with the receiver device 16 having the clamping elements 18 for the sensor holder 44, with the clamping elements 18 being able to be clamped tight by means of a cap nut 20 which engages into a thread 34 of the receiver device 16.

FIG. 4 shows an enlarged representation of a detail in accordance with FIG. 3 with the cap nut 20 and a part of the sensor holder 44 and a part of the installation body 14.

The sensor holder 44 and the installation body 14 are configured to be adjusted by a telescopic extension and retraction or such that the sensor holder 44 is rotatable with respect to the installation body 14. Degrees of freedom can thus be adjusted in a spacing direction or vertical direction or in an angle of rotation. The sensor holder 44 is locked in the desired position by the clamping elements 18 since the sensor holder 44 is initially held by force transmission. The sensor holder 44 is, however, still adjustable in this position. As soon as the sensor holder 44 has reached the desired position, the position is fixed with the aid of the cap nut 20. This is done in that the cap nut 20 has an internal thread 48 and a conical inner surface 50 at the inner side. The internal thread 48 engages into the thread 24 of the receiver device. The clamping elements 18 which each have an oblique surface 52 at their outer sides which is adapted to the conical inner surface 50 of the cap nut 20 are pressed toward the outer side of the sensor holder 44 by a rotation of the cap nut 20 into the thread 24, whereby the sensor holder 44 is clamped tight in the installation body 14.

The cap nut 20 has a first sealing ring 30 at its opening 28, said first sealing ring contacting the sensor holder 44, and has a second sealing ring 34 at the oppositely disposed opening 23, said second sealing ring contacting the installation body 14. The sealing rings 30 and 34 are inserted into a peripheral internal groove at the respective openings 28 and 32 of the cap nut 20. Due to the support in the inner groove, the sealing rings 30 and 34 are also held securely in the cap nut on a displacement of the sensor holder. It is ensured by the sealing rings 30 and 34 that a tight connection is present between the sensor holder 44 and the installation body 14. The seal by the sealing rings 30 and 34 is configured such that it also withstands high pressure strains, that is, for example, a steam jet or a water jet of a cleaning device. The sealing rings 30 and 34 are connected to the cap nut 20 without joins.

An angle α between an outer surface 36 of the first sealing ring 30 and an outer surface 38 of the sensor holder 44 or between an outer surface 40 of the second sealing ring 34 and an outer surface 42 of the installation body 14 is larger than 90 degrees, that is it is formed as an obtuse angle α. It is prevented by the obtuse angle α between the sealing rings 30 and 34 and the sensor holder 44 that dirt can collect at the connection point between the sensor holder 44 or the installation body 14 and the sealing rings 30 and 34.

Figure 1:
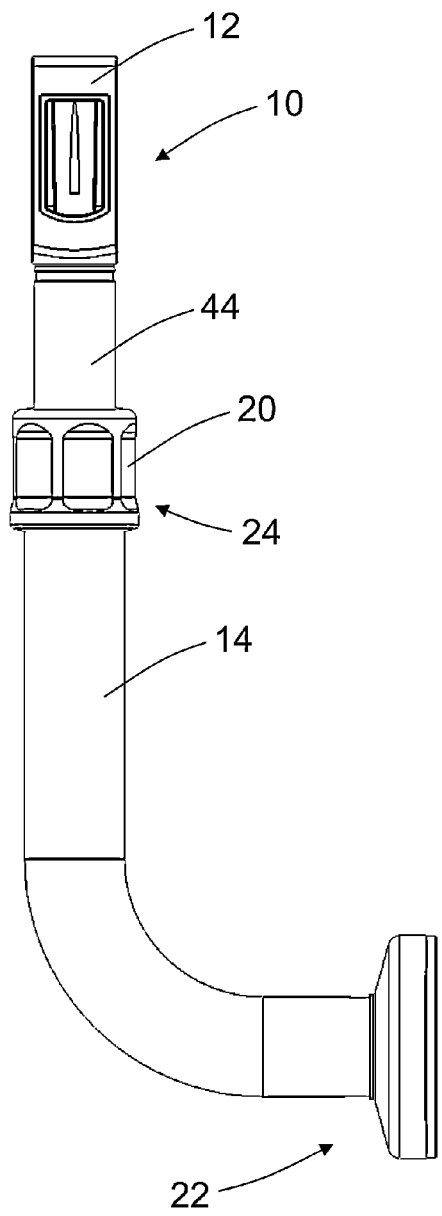
Figure 2:
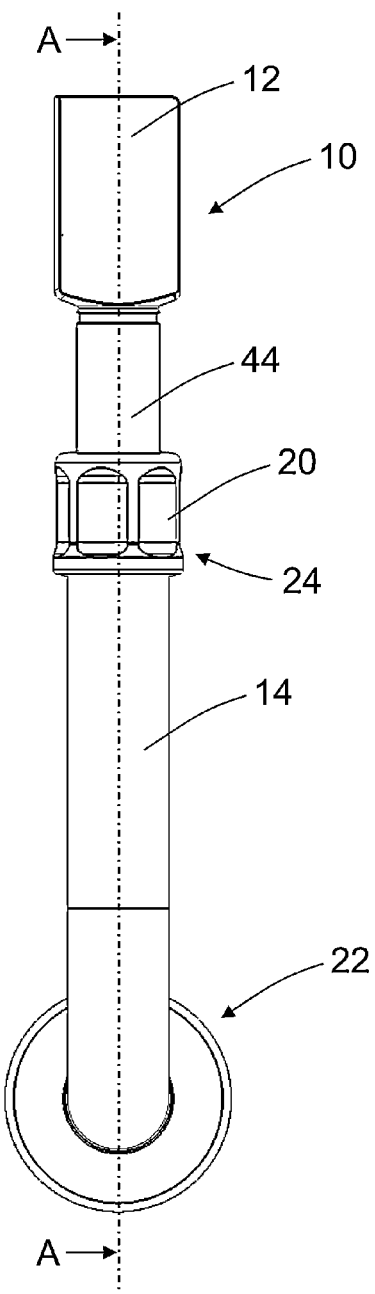
Figure 3:
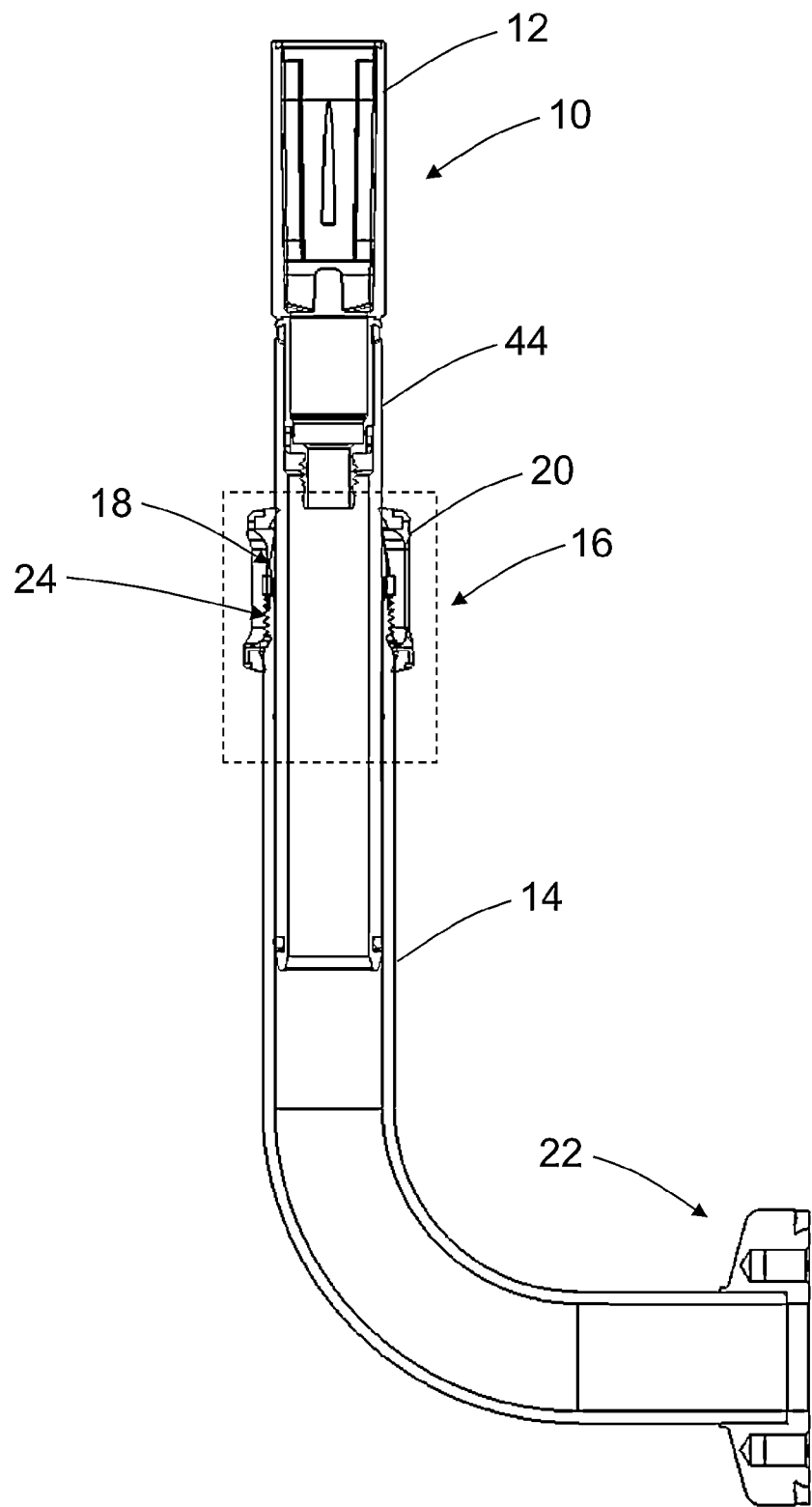
Figure 4:
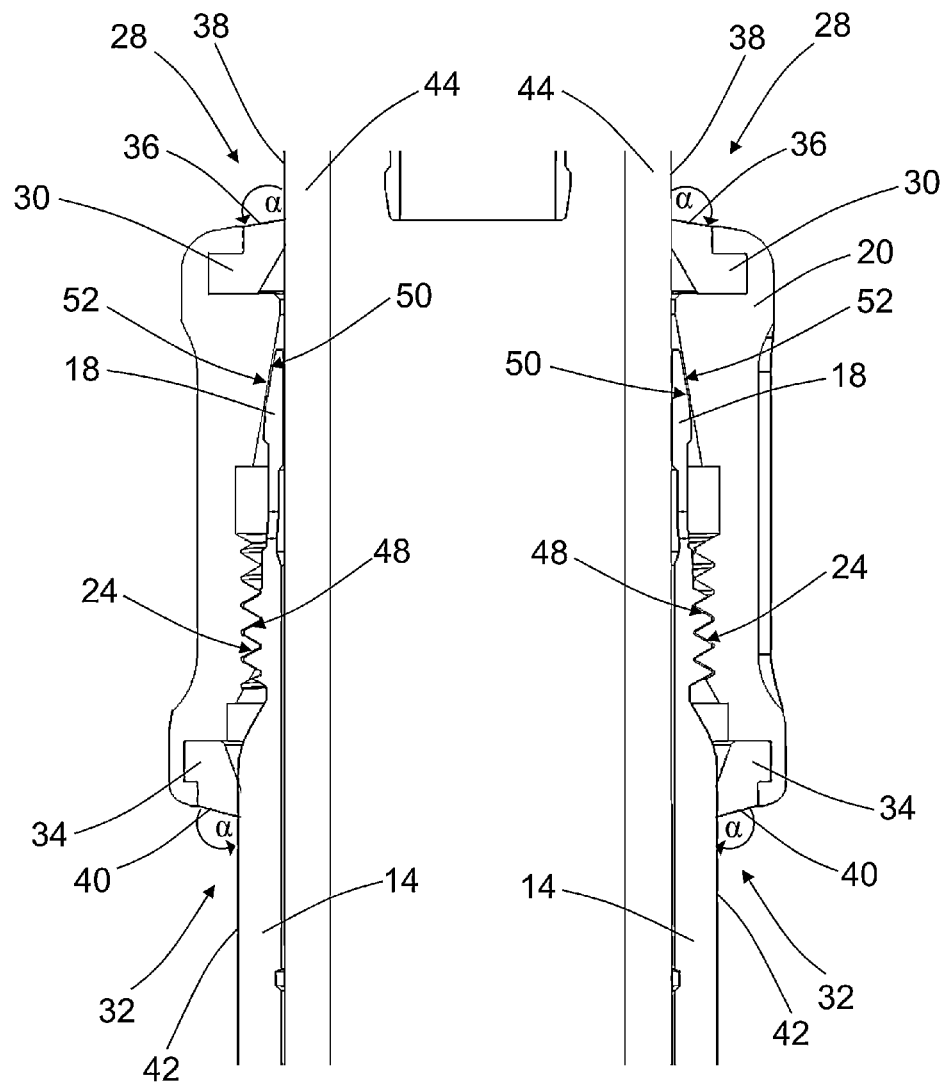
Figure 5:
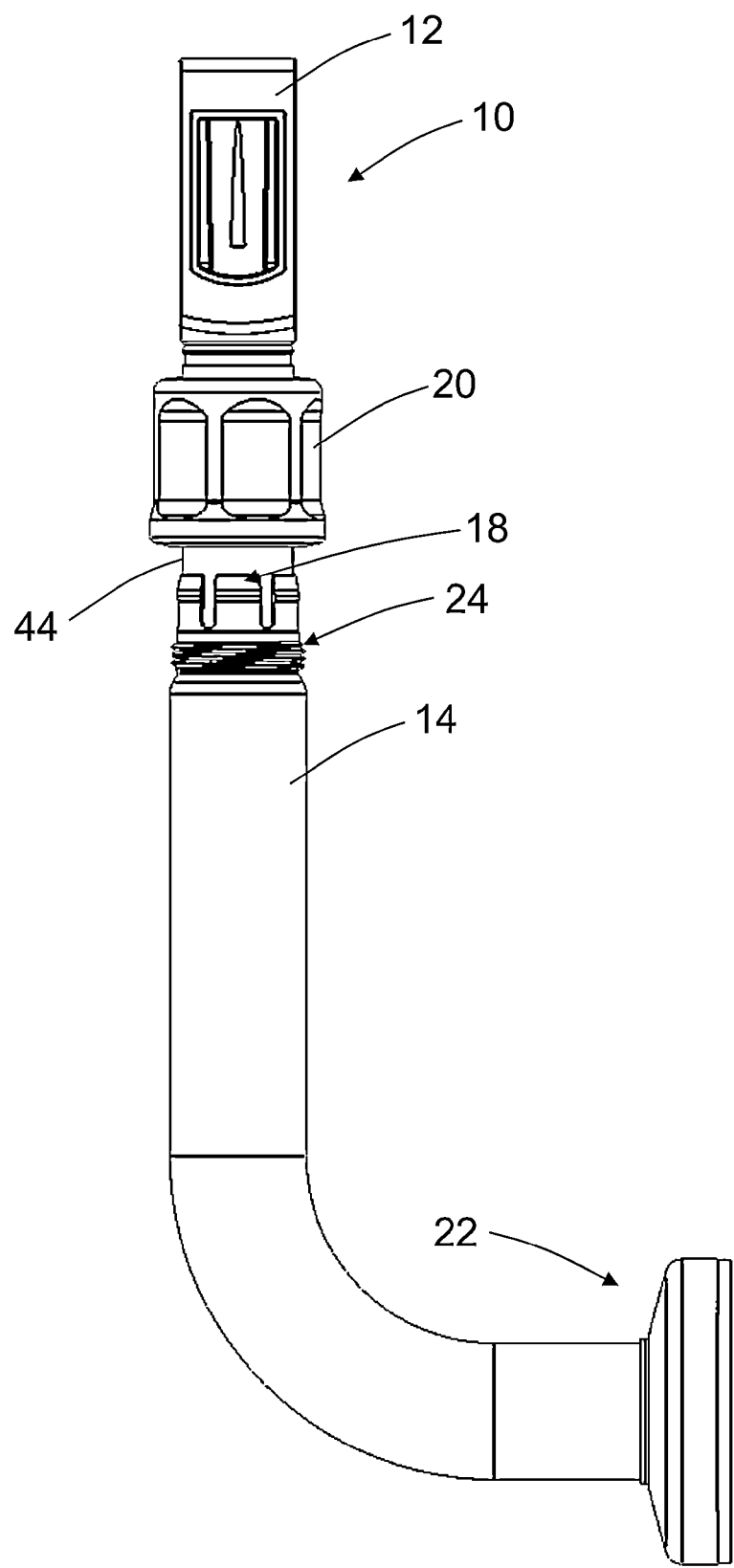
FIG. 5 shows a representation of the sensor in accordance with FIG. 1, with the cap nut being released.
Figure 6:
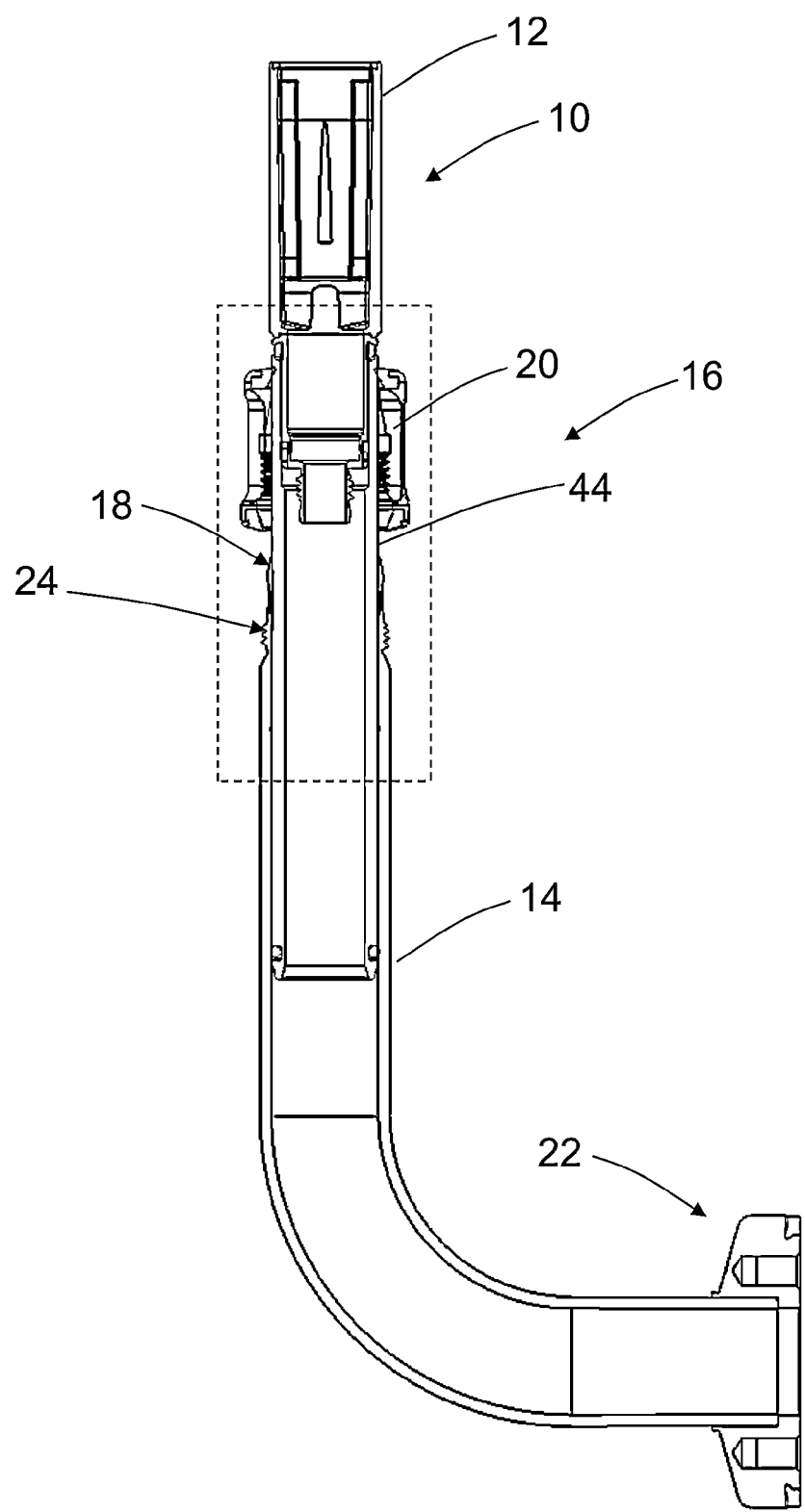
FIG. 6 shows a sectional representation in accordance with FIG. 5.
Figure 7:
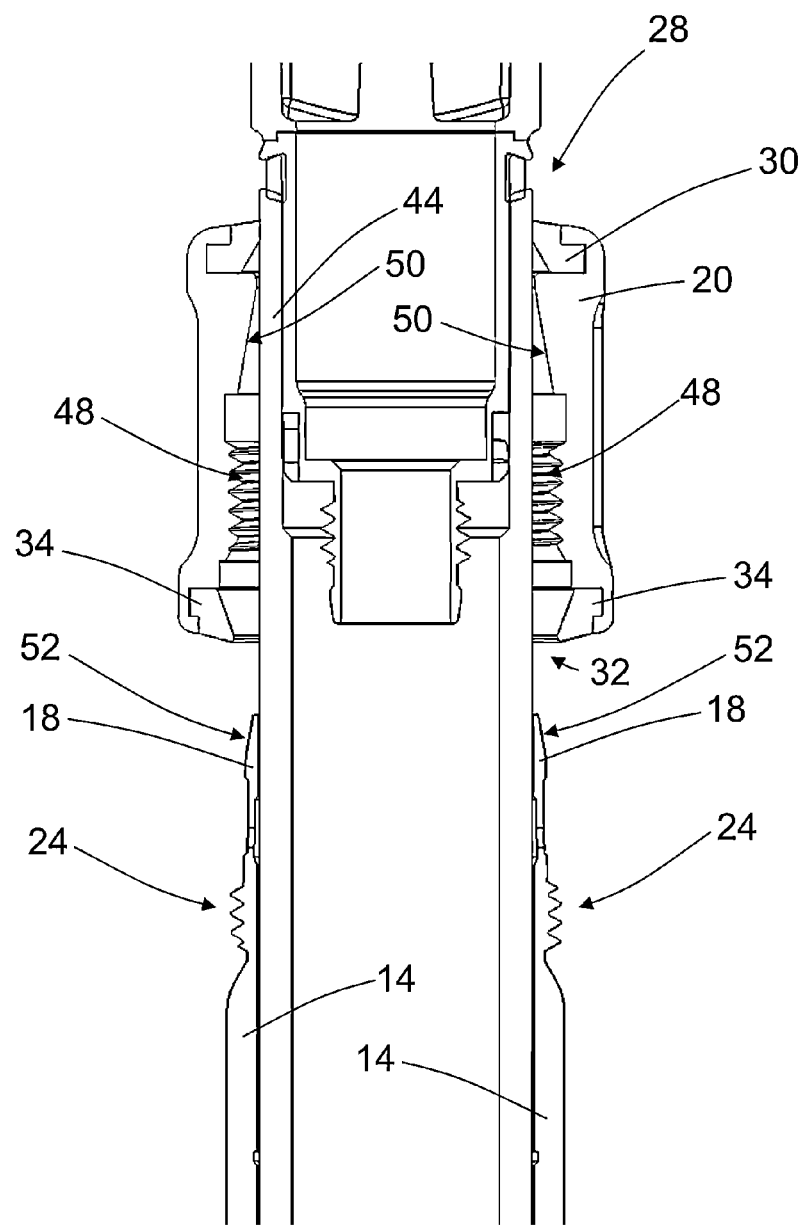
FIG. 7 shows an enlarged representation of a detail in accordance with FIG. 6 with the same parts as in FIG. 4.
Figure 8:
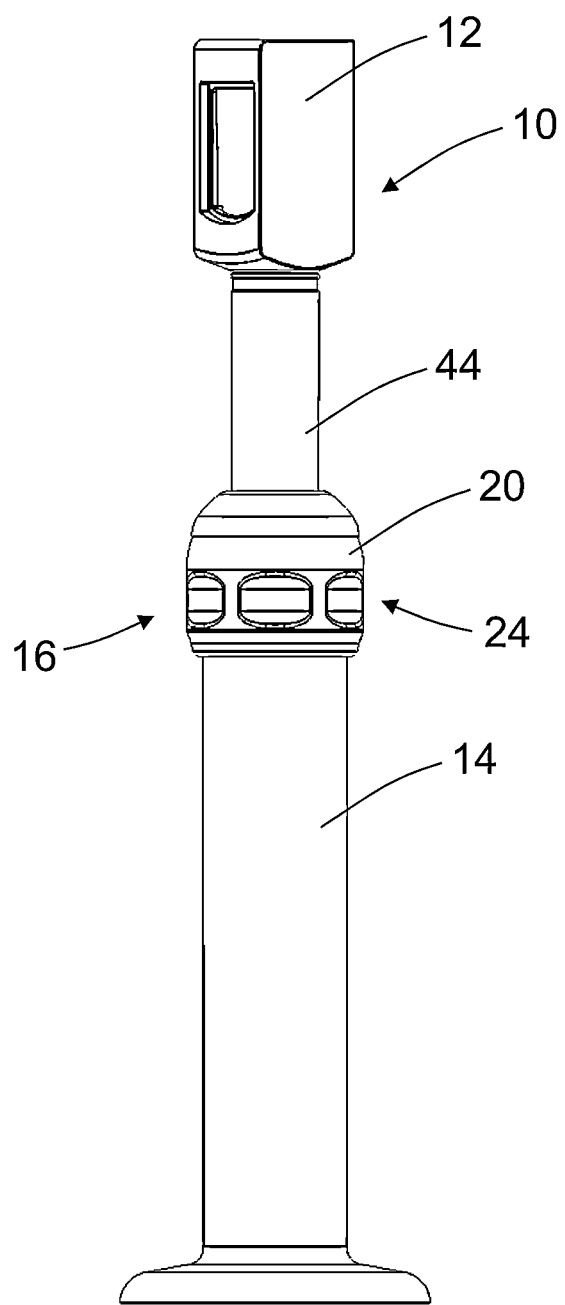

FIG. 8 shows an embodiment of a sensor 10 in accordance with the invention having a sensor housing 12, a sensor holder 44 to which the sensor housing 12 is fastened and having an installation body 14 which has a receiver device 16 for the sensor holder 44 at its one end and, optionally, an installation region 22 for attaching the sensor 10 to an operating site. The sensor holder 44 and the installation body 14 are optionally tubular.

Figure 9:
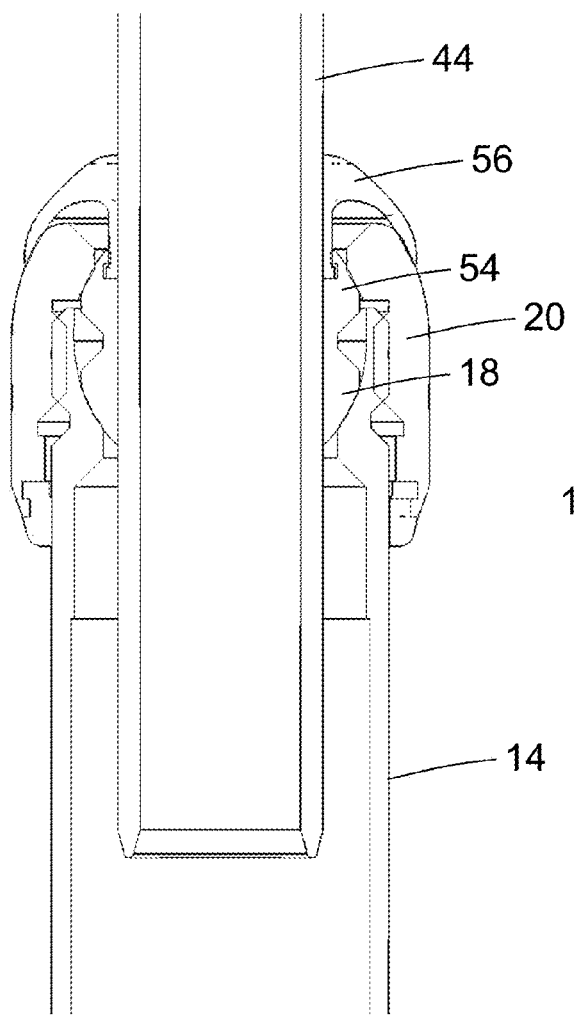

FIG. 9 shows an enlarged representation of a detail in accordance with FIG. 8 with the cap nut 20 and a part of the sensor holder 44 and a part of the installation body 14.

The sensor holder 44 and the installation body 14 are configured to be adjusted by a telescopic extension and retraction or such that the sensor holder 44 is rotatable with respect to the installation body 14. The sensor holder 44 is furthermore tiltable with respect to the installation body 14. Degrees of freedom can thus be adjusted in a spacing direction or vertical direction or in an angle of rotation or a tilt angle. The sensor holder 44 is locked in the desired position by the clamping elements 18 of the clamping body 54 since the sensor holder 44 is initially held by force transmission. The sensor holder 44 is, however, still adjustable in this position. As soon as the sensor holder 44 has reached the desired position, the position is fixed with the aid of the cap nut 20.

The cap nut 20 has a partly spherical segment for receiving a clamping body 54. The sensor holder 44 is displaceably arranged in the clamping body 54. In this respect, the clamping body 54 lies in a partly spherical segment of the installation body 14, whereby the clamping body 54 with the sensor holder 44 is tiltably supported in the installation body 14. The sensor holder 44 is furthermore optionally also displaceable and rotatable with respect to the installation body 14. The clamping body 54 can be locked by the cap nut 20 so that the sensor holder 44 is fixable at a specific tilt position.

Figure 10:
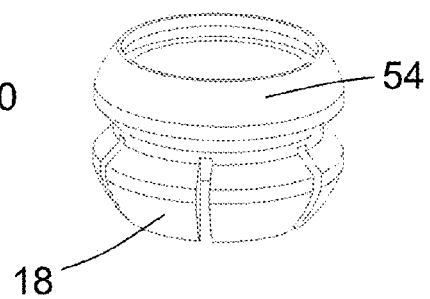

The clamping body 654 is shown in perspective in FIG. 10. The clamping body 54 has slits at the contacting side in the installation body 14, whereby the clamping elements 18 are formed to allow a clamping by the cap nut 20. No slits are provided at the side contacting the cap nut 20 to form a tight interface between the cap nut 20 and the clamping body 54 and between the sensor holder 44 and the clamping body 54. Furthermore, a mushroom-shaped seal 56 is anchored at the clamping body 54 to prevent fluid or dirt from being able to enter into the installation body 14, the sensor holder 44 or the sensor 12.

Figure 11:
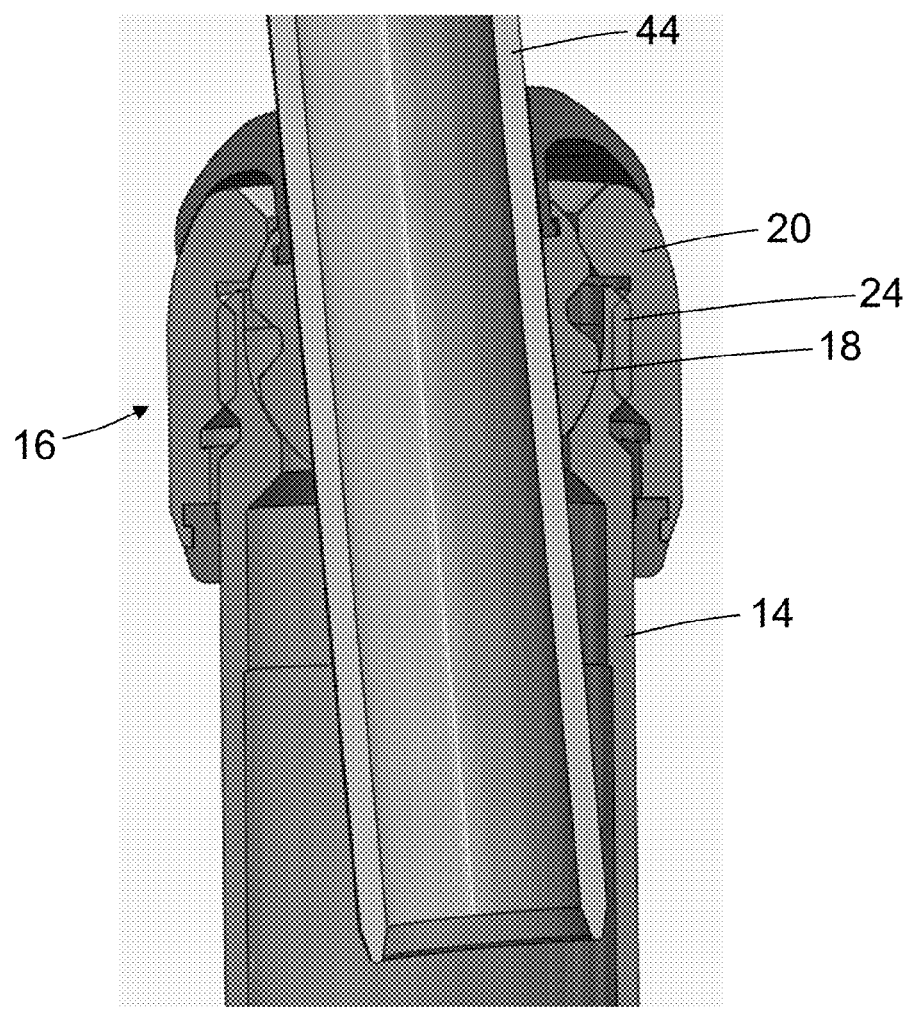

FIG. 11 shows a sensor holder 44 to which the sensor housing is fastened as well as the installation body 14 which has a receiver device 16 for the sensor holder 44 at its one end, with the receiver device 16 being configured such that the sensor holder 44 is rotatably with respect to the installation body 14 and/or is adjustable by telescopic extension and retraction and/or is tiltable with respect to the installation body 14, with the receiver device 16 having clamping elements 18 for the sensor holder 44, with the clamping elements 18 being able to be clamped by means of a cap nut 20 which engages into a thread 24 of the receiver device 16.

Figure 12:
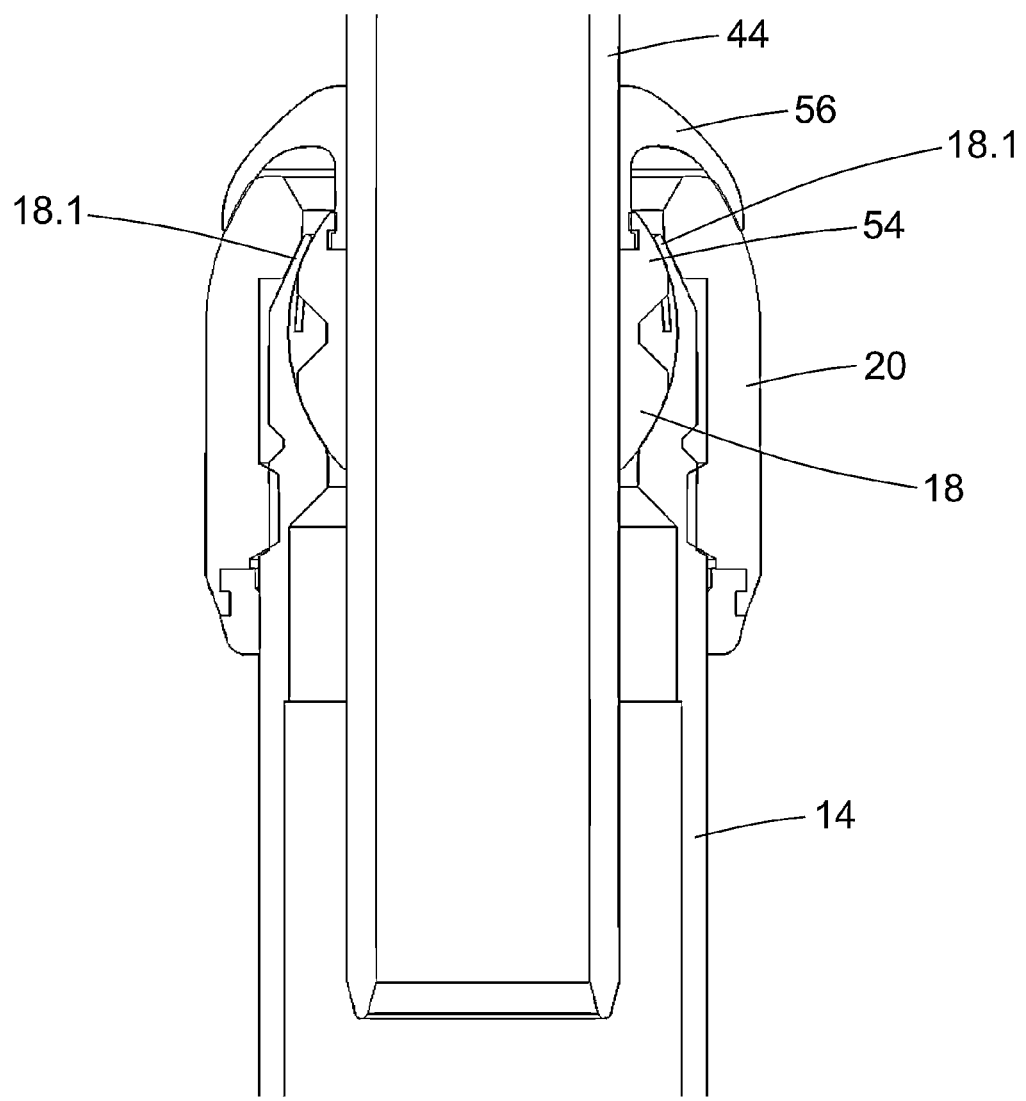

FIG. 12 shows a sensor holder 44 and an installation body 14. The installation body 14 has clamping elements 18.1 which also surround the clamping body 54 from the side of the cap nut 20 and prevent any direct contact between the cap nut 20 and the clamping body 54. The clamping elements 18.1 lie between the clamping body 54 and the cap nut 20. A rotation of the clamping body 54 can thereby be prevented by the friction of the cap nut 20 to be turned tight.

REFERENCE NUMERALS 10 optoelectronic sensor
12 sensor housing
14 installation body
16 receiver device
18 clamping elements
20 cap nut
22 installation region
24 thread
28 opening
30 first sealing ring
32 oppositely disposed opening
34 second sealing ring
36 outer surface
38 outer surface
40 outer surface
42 outer surface
44 sensor holder
48 internal thread
50 conical inner surface
52 oblique surface
54 clamping body
56 mushroom-shaped seal
α angle

The invention claimed is:

1. A sensor comprising:
a sensor housing (12) coupled to a sensor holder (44);
an installation body (14) having an interior space whereby connector lines for a sensor are guided through the installation body (14);
a receiver device (16) for the sensor holder (44) at one end of the installation body (14) and comprising clamping elements (18) for securing the receiver device (16) to sensor holder (44); wherein
the receiver device (16) is configured such that the sensor holder (44) is one of (a) rotatable with respect to the installation body (14) and is adjustable by a telescopic extension and retraction or (b) rotatable with respect to the installation body and tiltable with respect to the installation body;

the clamping elements (18) are secured to the sensor holder (44) using a cap nut (20) which engages with threads (24) on the receiver device (16);

the cap nut (20) comprises a first sealing ring (30) at an opening (28) formed between the cap nut (20) and the sensor holder (44), said first sealing ring contacting the sensor holder (44), and has a second sealing ring (34) at an oppositely disposed opening (32) formed between the cap nut and the installation body, said second sealing ring contacting the installation body (14); and wherein the sealing rings (30, 34) are connected without joints to the cap nut (20) and an angle (a) greater than 90° is formed between an outer surface (36) of the first sealing ring (30) and an outer surface (38) of the sensor holder (44) or between an outer surface (40) of the second sealing ring (34) and an outer surface (42) of the installation body (14).

2. The sensor in accordance with claim 1, wherein the receiver device has a rotatable clamping body (54) having at least one partly spherical surface and one mushroom-shaped seal (56).

3. The sensor in accordance with claim 1, wherein the installation body (14) is coherent.

4. The sensor in accordance with claim 3, wherein the coherent installation body (14) is made of one piece.

5. The sensor in accordance with claim 1, wherein the sensor holder (44) is configured to release and to fix the sensor housing (12) so that the sensor housing (12) can be replaced.

6. The sensor in accordance with claim 5, wherein the installation body (14) and/or the sensor holder (44) is/are configured in multipart modular form.

7. The sensor in accordance with claim 1, wherein the sensor holder (44) has a bayonet connection for receiving the sensor housing (12).

8. The sensor in accordance with claim 1, wherein the installation body (14) and/or the sensor holder (44) is/are configured in multipart modular form.

9. The sensor in accordance with claim 1, wherein the sensor is configured as a through beam light barrier, a reflection light barrier or a light scanner.

* * * * *